US010735520B2

(12) United States Patent
Yoneda et al.

(10) Patent No.: US 10,735,520 B2
(45) Date of Patent: Aug. 4, 2020

(54) CONTROL DEVICE, CONTROL SYSTEM, CONTROL METHOD, AND NON-TRANSITORY COMPUTER-READABLE STORAGE MEDIUM

(71) Applicant: OMRON Corporation, Kyoto (JP)

(72) Inventors: Mitsuhiro Yoneda, Tenri (JP); Hirohito Mizumoto, Otsu (JP); Ziqiang Xu, Kusatsu (JP)

(73) Assignee: OMRON Corporation, Kyoto (JP)

( * ) Notice: Subject to any disclaimer, the term of this patent is extended or adjusted under 35 U.S.C. 154(b) by 65 days.

(21) Appl. No.: 16/190,158

(22) Filed: Nov. 14, 2018

(65) Prior Publication Data
US 2019/0253497 A1 Aug. 15, 2019

(30) Foreign Application Priority Data

Feb. 14, 2018 (JP) ................................ 2018-024089

(51) Int. Cl.
*H04L 29/08* (2006.01)
*H04J 3/16* (2006.01)
*H04L 29/06* (2006.01)
*H04L 12/911* (2013.01)

(52) U.S. Cl.
CPC ............ *H04L 67/12* (2013.01); *H04J 3/1694* (2013.01); *H04L 69/28* (2013.01); *H04L 47/826* (2013.01)

(58) Field of Classification Search
None
See application file for complete search history.

(56) References Cited

U.S. PATENT DOCUMENTS

2002/0062410 A1* 5/2002 Sasamori ............. H04L 12/403
 710/36
2017/0034033 A1* 2/2017 Mizoguchi ............ G05B 19/05
2017/0373821 A1* 12/2017 Arakawa ............... H04L 7/0008
(Continued)

FOREIGN PATENT DOCUMENTS

JP 2004363782 12/2004

OTHER PUBLICATIONS

"Search Report of Europe Counterpart Application," dated Jun. 27, 2019, p. 1-p. 8.

*Primary Examiner* — Bunjob Jaroenchonwanit
(74) *Attorney, Agent, or Firm* — JCIPRNET

(57) ABSTRACT

A control device includes a cyclic communication part, a message communication part, and a communication management part. The cyclic communication part performs communication according to a preset cyclic period. The message communication part performs communication that need not conform to the cyclic period. The communication management part manages a communication schedule for the cyclic communication part and the message communication part. When it is detected that control data scheduled to be communicated is data for preferentially selecting communication in the cyclic communication part, the communication management part detects a communication state of the cyclic communication part. When cyclic communication is possible, the communication management part stores the control data in the cyclic communication part, and when cyclic communication is not possible, the communication management part stores the control data in the message communication part.

11 Claims, 9 Drawing Sheets

(56) References Cited

U.S. PATENT DOCUMENTS

| | | | |
|---|---|---|---|
| 2018/0203818 A1* | 7/2018 | Fukuda | G06F 13/362 |
| 2018/0249324 A1* | 8/2018 | Parviainen | H04L 67/12 |
| 2018/0331791 A1* | 11/2018 | Li | H04L 1/18 |
| 2019/0126475 A1* | 5/2019 | Kawanishi | B25J 19/06 |
| 2019/0253355 A1* | 8/2019 | Sawada | G05B 19/408 |
| 2019/0253356 A1* | 8/2019 | Yoneda | H04L 47/12 |

* cited by examiner

CONTROL DEVICE, CONTROL SYSTEM, CONTROL METHOD, AND NON-TRANSITORY COMPUTER-READABLE STORAGE MEDIUM

CROSS-REFERENCE TO RELATED APPLICATION

This application claims the priority of Japan patent application serial no. 2018-024089, filed on Feb. 14, 2018. The entirety of the above-mentioned patent application is hereby incorporated by reference herein and made a part of this specification.

BACKGROUND

Technical Field

The disclosure relates to a control system including a control device that performs communication of a plurality of types of control data having different performance requirements and various slave devices.

Description of Related Art

Currently, many factory automation (FA) systems are in practical use. An FA system includes a control device and a plurality of slave devices. The plurality of slave devices include a measurement instrument, a switch, a control driver, and the like, and a control target device is connected to the control driver.

The control device performs communication of control data with a plurality of slave devices. In this case, the control device performs sequential communication of control data with a plurality of slave devices using a preset control period (cyclic period). Therefore, a real time property of transmission of control data is guaranteed. Hereinafter, the control data will be referred to as cyclic control data.

On the other hand, information system data different from cyclic control data is communicated between a control device and a plurality of slave devices. Information system data is data that need not necessarily be communicated using a cyclic period and has a relatively large volume like cyclic control data. In the system shown in Patent Document 1, the information system data is divided and communicated in a plurality of cyclic periods in a divided manner.

PATENT DOCUMENTS

[Patent Document 1] Japanese Laid-open No. 2004-363782

However, control data communicated to a robot device, a robot control device, or the like includes a plurality of commands and the like, and may have a larger volume than cyclic control data of the related art. Hereinafter, control data that is communicated to the robot device, the robot control device, or the like and has a larger volume than cyclic control data of the related art will be referred to as quasi-control data.

Here, when a data volume of quasi-control data is larger than a communication upper limit volume allocated to the quasi-control data for one cycle of a cyclic period, the control device may not be able to communicate all quasi-control data within a cyclic period.

In this case, it is conceivable that the control device divides quasi-control data according to a communication upper limit volume allocated for a cyclic period and performs communication over a plurality of cyclic periods. Then, a user has to describe a process of allocating the divided quasi-control data to each data area that is transmitted in each period in a control program. Therefore, creation of a control program by the user becomes complicated.

In addition, when there are many communication methods, the user has to describe designation and selection of a communication method for each command when a control program is created. Therefore, a configuration of the control program becomes complicated and it is difficult for the user to understand the control program.

In addition, it is conceivable that cyclic communication is not possible according to a communication state. In order to prepare such a case, the user has to designate a communication method by which each command is communicated. Therefore, a configuration of the control program becomes more complicated and it is more difficult for the user to understand the control program.

The disclosure provides a technology for appropriately selecting a plurality of communication methods according to a communication state and performing communication of control data even with a program configuration simpler than the related art.

SUMMARY

According to an example of the disclosure, a control device includes a cyclic communication part, a message communication part, and a communication management part. The cyclic communication part performs communication according to a preset cyclic period. The message communication part performs communication that need not conform to the cyclic period. The communication management part manages a communication schedule for the cyclic communication part and the message communication part. When it is detected that control data scheduled to be communicated is data for preferentially selecting communication in the cyclic communication part, the communication management part detects a communication state of the cyclic communication part. When cyclic communication is possible, the communication management part stores the control data in the cyclic communication part, and when cyclic communication is not possible, the communication management part stores the control data in the message communication part.

DESCRIPTION OF THE EMBODIMENTS

Embodiments of the disclosure will be described below with reference to the drawings.

Application Example

A control device, a control system, a control method, and a control program according to embodiments of the disclosure will be described with reference to the drawings. In the present embodiment, a factory automation (FA) system will be exemplified as a control system.

Figure 5:
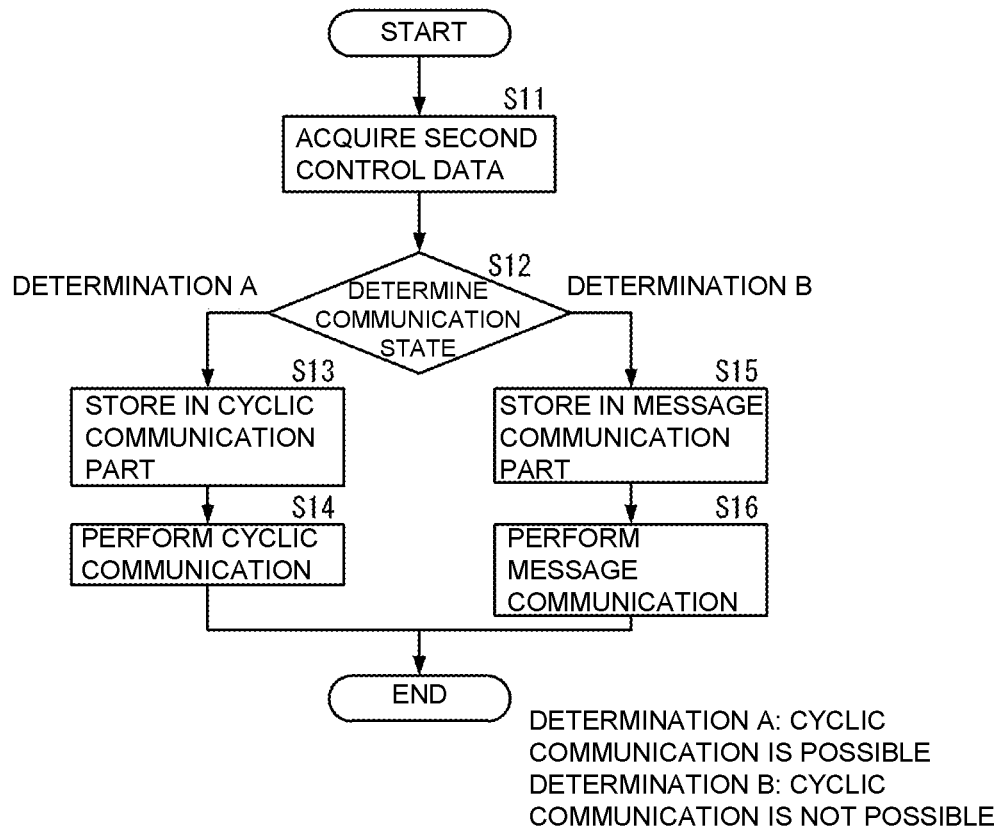
FIG. 5 is a flowchart showing a basic process performed by the control device.

FIG. 5 is a flowchart showing a basic process of a control device. As shown in FIG. 5, when second control data is acquired (S11), a communication management part 110 of a control device 10 determines a communication state of cyclic communication (S12). The second control data is data in which a time longer than one cycle of a cyclic period of cyclic communication is set as an arrival guarantee time. For example, the second control data includes a command of a robot device, a log acquisition request, and the like.

When cyclic communication is possible (determination A in S12), the communication management part 110 of the control device 10 stores the acquired second control data in a cyclic communication part 121 (S13). The cyclic communication is communication according to a cyclic period. The cyclic communication part 121 performs cyclic communication of the stored second control data (S14).

When cyclic communication is not possible (determination B in S12), the communication management part 110 of the control device 10 stores the acquired second control data in a message communication part 122 (S15). The message communication is communication that need not conform to cyclic communication. The message communication part 122 performs message communication of the stored second control data (S16).

Therefore, the control device 10 can perform communication of second control data according to a communication state using a more appropriate communication method. In addition, accordingly, a user need not describe a selection condition and a selection method of a communication method of second control data in a control program. Therefore, a load of creating a program by a user is reduced according to a simple program configuration.

Configuration Examples

Figure 1:
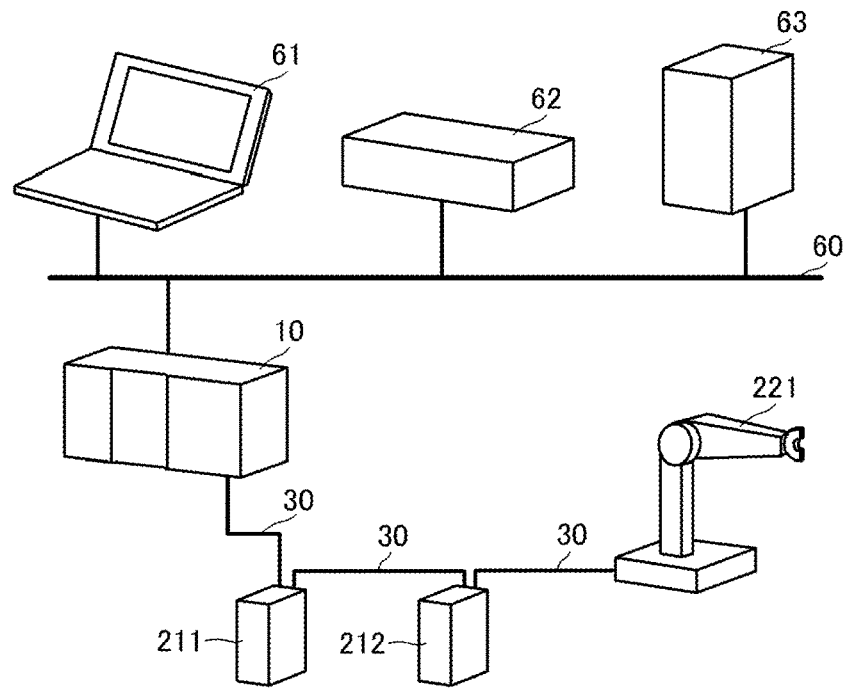
FIG. 1 is a diagram showing a schematic configuration of a device in a control system.

FIG. 1 is a diagram showing a schematic configuration of a device in a control system. As shown in FIG. 1, a control system 1 includes a control device 10, a slave device 211, a slave device 212, a slave device 221, a control network 30, an information communication network 60, a personal computer 61, an industrial personal computer 62, and a database device 63.

(Data Definition)

First, a definition of data will be described.

In first control data, an arrival guarantee time (first guarantee time) is determined according to one cycle of a cyclic period (for example, 10 msec or shorter) used in the control network 30. The first control data is composed of a control data group of 1 bit to several tens of bytes. The arrival guarantee time is, for example, the longest (latest) time within which control data should arrive in order for a target slave device to operate normally.

The second control data is control data that is defined so that communication is completed in an arrival guarantee time (first guarantee time) longer than one cycle of a cyclic period. As the second control data, there is data having a larger data volume than first control data. For example, there is data having a larger volume than a data volume that can be communicated in one cycle of a cyclic period. The second control data is control data in which a sequence of a plurality of pieces of information to be included is determined. The second control data includes, for example, a plurality of command groups that implement a sequence operation of a robot device.

The information system data is data which is different from the first control data and the second control data and in which an arrival guarantee time is not set. For example, the information system data may include various types of data such as acquisition request data of a log of each device connected to the control network 30, a log, and a monitoring image.

The first control data and the second control data are data that is communicated according to a cyclic period, and the information system data is data that is communicated according to a specification that need not conform to a cyclic period.

(Control System)

The control network 30 is, for example, a network according to EtherCAT (registered trademark) or PROFINET as a network standard. Here, the control network 30 is not limited thereto, and may be a network through which data is transmitted and received in synchronization with a cyclic period. The control device 10, the slave device 211, the slave device 212, and the slave device 221 are connected via the control network 30.

The information communication network 60 is, for example, a network according to Ethernet (registered trademark) as a network standard. The control device 10, the personal computer 61, the industrial personal computer 62, and the database device 63 are connected via the information communication network 60.

In the personal computer 61, an editing tool of a control program and the like are installed. The personal computer 61 creates, edits, and outputs a control program of the control device 10, the slave device 211, and the slave device 212. The personal computer 61 outputs the control program to the control device 10.

In the industrial personal computer 62, for example, an editing tool of a robot control program and the like are installed. The industrial personal computer 62 creates, edits, and outputs a control program of the slave device 221. The industrial personal computer 62 outputs, for example, the robot control program to the control device 10.

The database device 63 stores a log of each device from the control device 10 and the like. Here, a device that generates and acquires original data of information system data is not limited to the database device 63, and may be another device. In addition, the personal computer 61, the industrial personal computer 62, and the database device 63 are devices constituting a host system, and the devices constituting the host system are not limited thereto.

Specifically, the control device 10 is realized by, for example, a programmable logic controller (PLC). The control device 10 may be another device as long as it performs communication of control data via the control network 30 and performs communication of various types of data via the information communication network 60.

For example, the control device 10 may generate first control data using the control program from the personal computer 61. For example, the control device 10 may generate second control data using the robot control program from the industrial personal computer 62. Here, the control device 10 can generate second control data using the control program from the personal computer 61.

In addition, the control device 10 generates information system data. The information system data includes information that the personal computer 61 wishes to acquire from the slave device 211, the slave device 212, and the slave device 221 connected to the control network 30, an acquisition request of the information, and the like. Therefore, for example, information system data is generated by the control device 10 according to an instruction from the personal computer 61.

Specifically, the slave device 211 and the slave device 212 are realized by a measurement instrument, for example, a servo driver, or a sensor. Here, the slave device 211 and the slave device 212 may be other devices as long as they are devices that operate with first control data.

Specifically, the slave device 221 is realized by, for example, a robot device or a robot control device connected to a robot device. Here, the slave device 221 may be another device as long as it is a device that operates with second control data.

The control device 10, the slave device 211, the slave device 212, and the slave device 221 perform scheduling of transmission and reception of first control data, second control data, and information system data. The control device 10, the slave device 211, the slave device 212, and the slave device 221 perform communication of first control data and second control data according to the schedule and according to a cyclic period.

In this case, as described above, the control device 10 determines a communication state of cyclic communication. The control device 10 selects either cyclic communication or message communication according to the determination result of the communication state, and performs communication of second control data.

Schematically, the control device 10 selects cyclic communication when second control data can be communicated according to cyclic communication. On the other hand, the control device 10 selects message communication when second control data cannot be communicated according to cyclic communication. The cyclic communication is communication according to a cyclic period. The message communication is communication that need not conform to a cyclic period, and is, for example, best effort communication.

(Hardware Configuration of Control Device)

Figure 2:
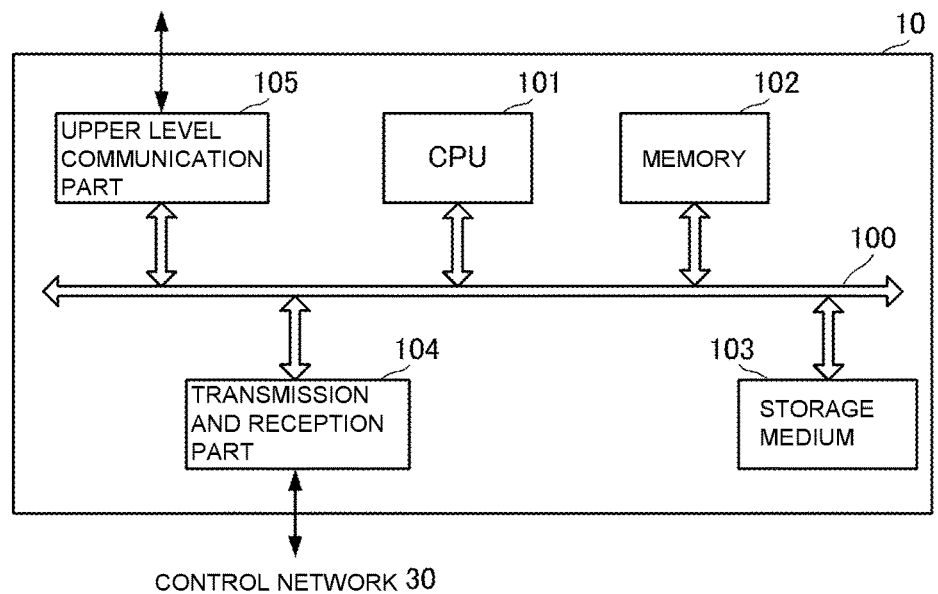
FIG. 2 is a block diagram showing a hardware configuration of a control device.

FIG. 2 is a block diagram showing a hardware configuration of the control device.

As shown in FIG. 2, as a hardware configuration, the control device 10 includes a CPU 101, a memory 102, a storage medium 103, a transmission and reception part 104, and an upper level communication part 105. In the control device 10, the CPU 101, the memory 102, the storage medium 103, the transmission and reception part 104, and the upper level communication part 105 are connected through a data bus 100.

The CPU 101 reads a system program stored in the storage medium 103 and a user application program to the memory 102 and executes them, and thus implements processes of functional blocks to be described below. The memory 102 is realized by a volatile memory element, for example, a DRAM and an SRAM. In addition, the storage medium 103 is realized by a nonvolatile storage medium, for example, a magnetic storage medium and a flash memory.

The transmission and reception part 104 is an interface of the control network 30 in the control device 10 and transmits and receives (communicates) first control data and second control data according to a cyclic period. In addition, for example, the transmission and reception part 104 transmits and receives (communicates) information system data using a communication band different from a communication band occupied by first control data and second control data in one cycle of a cyclic period.

The upper level communication part 105 is an interface of the information communication network 60 in the control device 10 and performs communication with each device of the above host system.

(Functional Block of Control Device)

Figure 3:
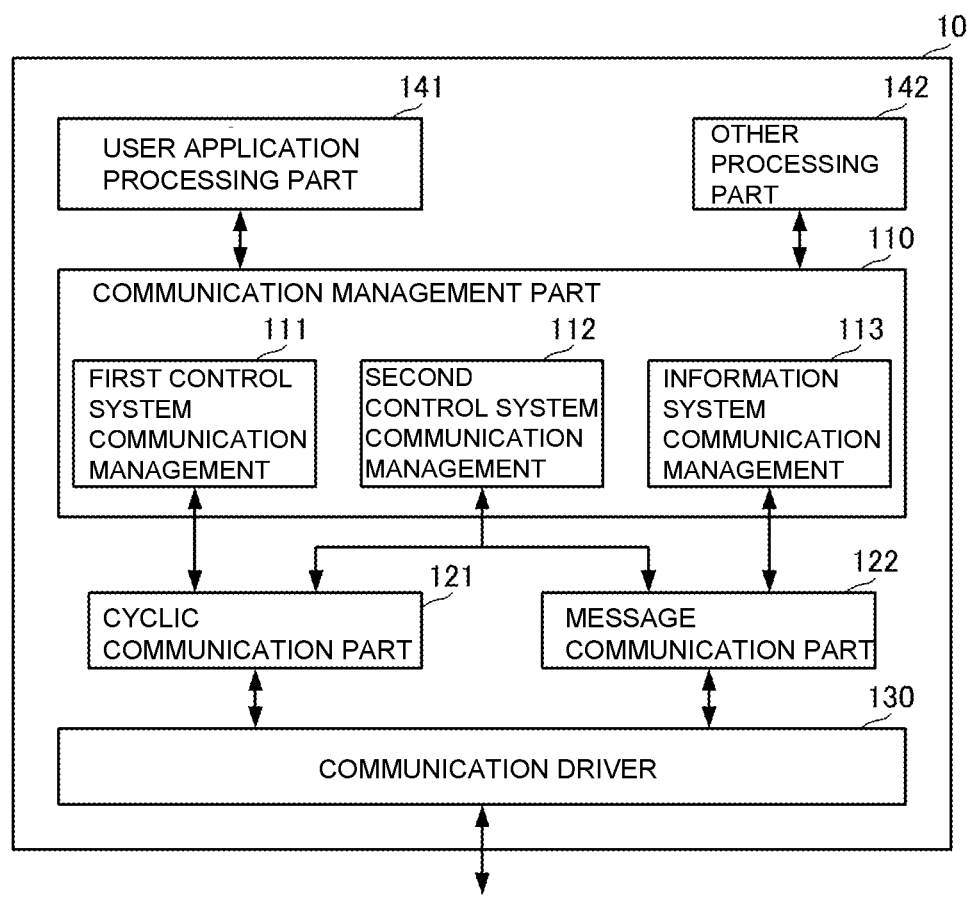
FIG. 3 is a functional block diagram of the control device.

FIG. 3 is a functional block diagram of the control device.

As shown in FIG. 3, the control device 10 includes a communication management part 110, a cyclic communication part 121, a message communication part 122, a communication driver 130, a user application processing part 141, and another processing part 142.

The communication management part 110 performs first control system communication management 111, second control system communication management 112, and information system communication management 113. In addition, the communication management part 110 performs scheduling of the first control system communication management 111, the second control system communication management 112, and the information system communication management 113, that is, scheduling of communication of various types of data to be described below. In this case, the communication management part 110 allocates a communication band of each slave device in one cycle of a cyclic period based on the number of communication target slave devices, and a type (refer to FIG. 4). In addition, the communication management part 110 determines a communication state of cyclic communication.

For example, the communication management part 110 determines a communication state of cyclic communication. Specifically, the communication management part 110 detects whether cyclic communication by the cyclic communication part 121 is possible. Such determination of a communication state can be realized based on, for example, a result of periodical communication of packet data for determining whether communication is possible, a response time from each slave device with respect to steady transmission of first control data and second control data, the presence or absence of a response, and the like. The packet data for determination is communicated at a timing at which there is no influence on communication of first control data and second control data.

In addition, for example, the communication management part 110 sequentially detects time synchronization accuracy of a timer for each slave device. The communication management part 110 determines that cyclic communication is possible when time synchronization accuracy is higher than a predetermined threshold value, and determines that cyclic communication is not possible when time synchronization accuracy is lower than a predetermined threshold value.

The communication management part 110 selects communication of second control data from cyclic communication and message communication according to a communication state of cyclic communication.

As described above, in the first control system communication management 111, communication management of first control data communicated for each cyclic period according to a preset cyclic period is performed. In the first control system communication management 111, first control data in the cyclic communication part 121 is stored.

In the second control system communication management 112, communication management of second control data is performed.

When second control data can be communicated according to cyclic communication, the second control system communication management 112 stores the second control data in the cyclic communication part 121. On the other hand, when second control data cannot be communicated according to cyclic communication, the control device 10 stores the second control data in the message communication part 122.

In addition, in the second control system communication management 112, second control data is divided into a plurality of communication data when a data volume of second control data is larger than a maximum volume (communication volume) of second control data that can be transmitted in one cycle of a cyclic period. Then, in the second control system communication management 112, communication management in units of a plurality of communication data is performed.

In the information system communication management 113, communication management of information system data is performed. In this case, information system data is also divided into a plurality of data when a data volume of information system data is larger than a maximum volume (transmission volume) of information system data that can be communicated in one cycle of a cyclic period. Then, in the information system communication management 113, communication management is performed in units of a plurality of divided data. The information system communication management 113 provides information system data to the message communication part 122. In this case, when information system data is divided into a plurality of data, the communication management part 110 provides each of the plurality of divided data to the message communication part 122.

The cyclic communication part 121 converts the first control data and the second control data into a data format of the control network 30. The cyclic communication part 121 outputs the converted first control data and second control data to the communication driver 130 according to a transmission and reception schedule.

The message communication part 122 outputs information system data or second control data according to a transmission and reception schedule to the communication driver 130.

The communication driver 130 controls the transmission and reception part 104, and performs communication of first control data and second control data via the control network 30. In this case, when second control data is divided into a plurality of communication data, the plurality of communication data are sequentially communicated. Similarly, when information system data is divided into a plurality of data, the plurality of divided data are sequentially communicated.

Here, the user application processing part 141 executes the above user application program. The user application processing part 141 acquires second control data from the industrial personal computer 62. For example, the other processing part 142 performs a start process of the control device 10, an initial process of control using the control network 30, or the like.

(Specific Communication Process)

COMMUNICATION PROCESSING EXAMPLE 1

Figure 4:
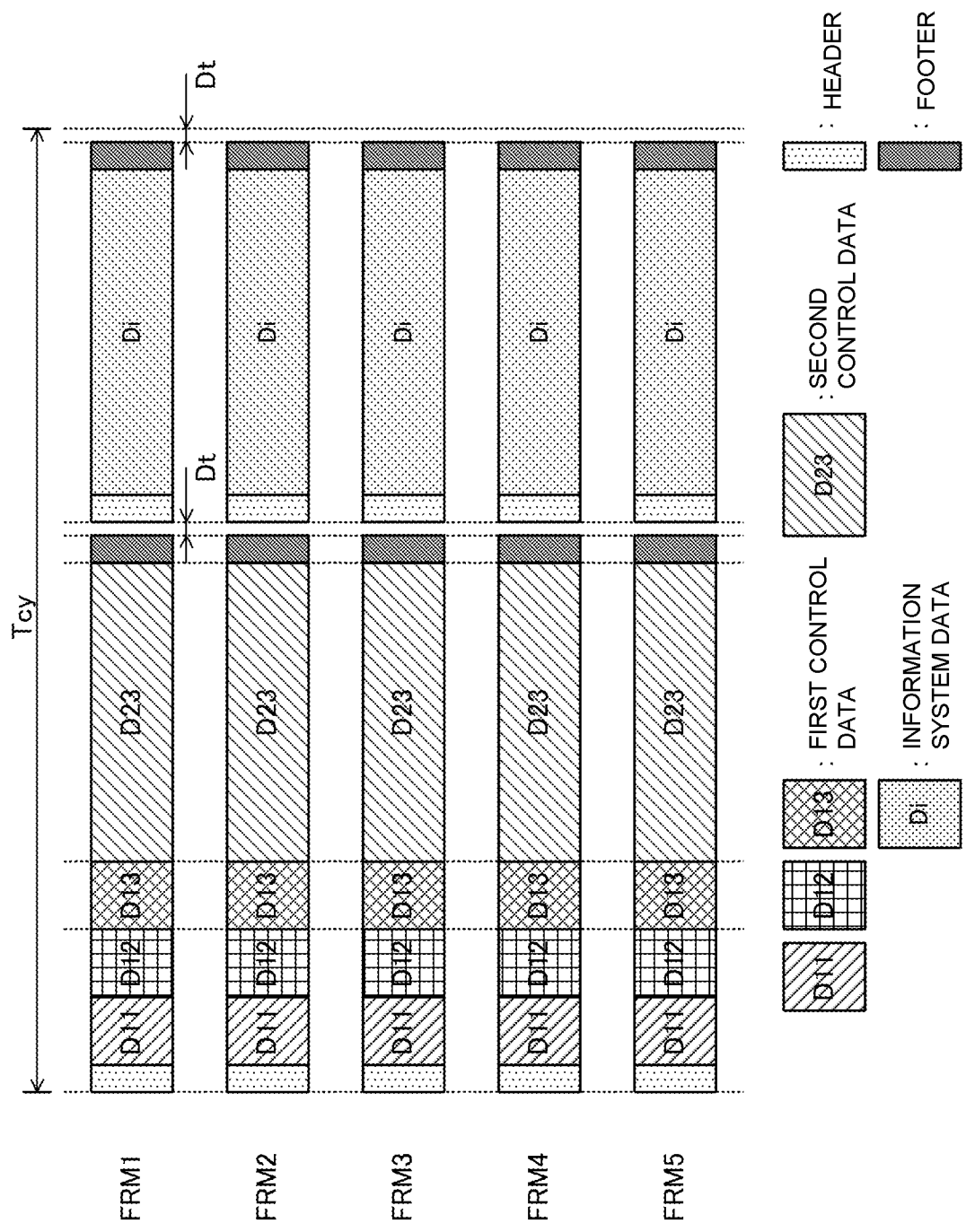
FIG. 4 is a diagram showing a schematic data structure of frame data communicated via a control network.

FIG. 4 is a diagram showing a schematic data structure of frame data communicated via a control network. Here, FIG. 4 shows the system configuration shown in FIG. 1. In addition, FIG. 4 shows a state in which cyclic communication is normally operated. FIG. 5 is a flowchart showing a basic process of the control device.

First, a structure of frame data will be described with reference to FIG. 4. As shown in FIG. 4, the frame data is data arranged, from the beginning, in order of a control data header, first control data D11 for the slave device 211, first control data D12 for the slave device 212, first control data D13 for the slave device 221, second control data D23 for the slave device 221, a control data footer, an information system data header, information system data Di, and an information system data footer. In addition, in FIG. 4, in the frame data, between the control data footer and the information system data header, and after the information system data header, an empty data area corresponding to a waiting time Dt for data collision avoidance is set. This waiting time Dt is preferably set, but it can be omitted. Thus, according to frame data having such a structure, communication in one cycle of a cyclic period is performed.

Here, when cyclic communication is not possible, that is, when communication of second control data is not possible, a band for second control data D23 in FIG. 4 is not used, and the band for second control data D23 is allocated to a band for information system data Di.

Using such a data structure, with reference to FIG. 5, as described above, the control device 10 performs communication of second control data according to a communication state using either cyclic communication or message communication.

As shown in FIG. 5, when second control data is acquired (S11), a communication management part 110 of a control device 10 determines a communication state of cyclic communication (S12). The second control data is data in which a time longer than one cycle of a cyclic period of cyclic communication is set as an arrival guarantee time. For example, the second control data includes a command of a robot device, a log acquisition request, and the like.

When cyclic communication is possible (determination A in S12), the communication management part 110 of the control device 10 stores the acquired second control data in a cyclic communication part 121 (S13). The cyclic communication is communication according to a cyclic period. The cyclic communication part 121 performs cyclic communication of the stored second control data (S14).

When cyclic communication is not possible (determination B in S12), the communication management part 110 of the control device 10 stores the acquired second control data in a message communication part 122 (S15). The message communication is communication that need not conform to cyclic communication. The message communication part 122 performs message communication of the stored second control data (S16).

Therefore, the control device 10 can perform communication of second control data according to a communication state in a more appropriate communication format.

Figure 6:
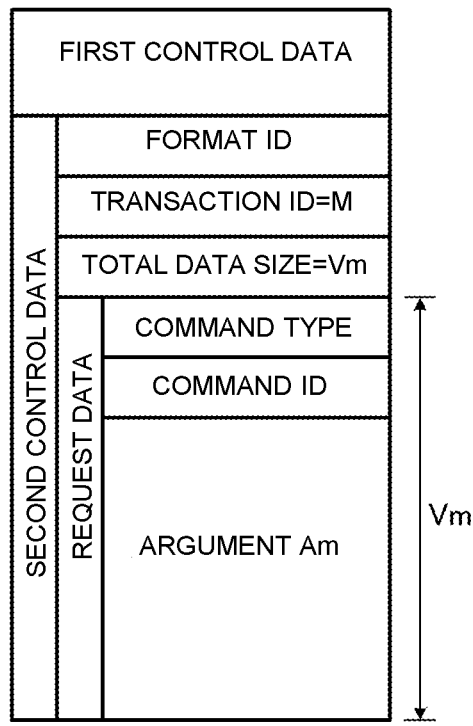
FIG. 6 is a diagram showing an example of a data structure when communication in a divided manner is not applied.

In such a process, for example, frame data may have a data structure shown in FIG. 6. FIG. 6 is a diagram showing an example of a data structure when communication in a divided manner is not applied. Here, FIG. 6 shows only a band for a slave device for which second control data is necessary.

As shown in FIG. 6, a data area for a slave device that performs communication of second control data in frame data includes a format ID, a transaction ID, a total data size, and request data, and is data arranged in that order from the leading bit.

The format ID is identification data in a data format of second control data. According to the format ID, a data format of second control data shown below can be identified.

The transaction ID is identification data representing second control data. When transaction IDs of second control data of a plurality of frames are compared, it is possible to determine whether second control data of the plurality of frames are based on the same second control data. That is, when transaction IDs of second control data (communication data) of a plurality of frames are the same, it is possible to determine that such second control data (communication data) are based on one second control data. On the other hand, when transaction IDs of second control data (communication data) of a plurality of frames are different, it can be determined that these second control data (communication data) are individual second control data.

The total data size Vm represents a total data volume of second control data.

Request data includes a command type, a command ID, an argument Am, and the like and is data arranged in that order from the leading bit. The argument Am includes a command group that is actually used for control, and the command type and the command ID are data for identifying a command group described in the argument Am. While request data has been exemplified here, this can also be applied to response data for request data. Also, the request data and the response data are not limited to the above data structure and can be arbitrarily defined.

COMMUNICATION PROCESSING EXAMPLE 2

Figure 7:
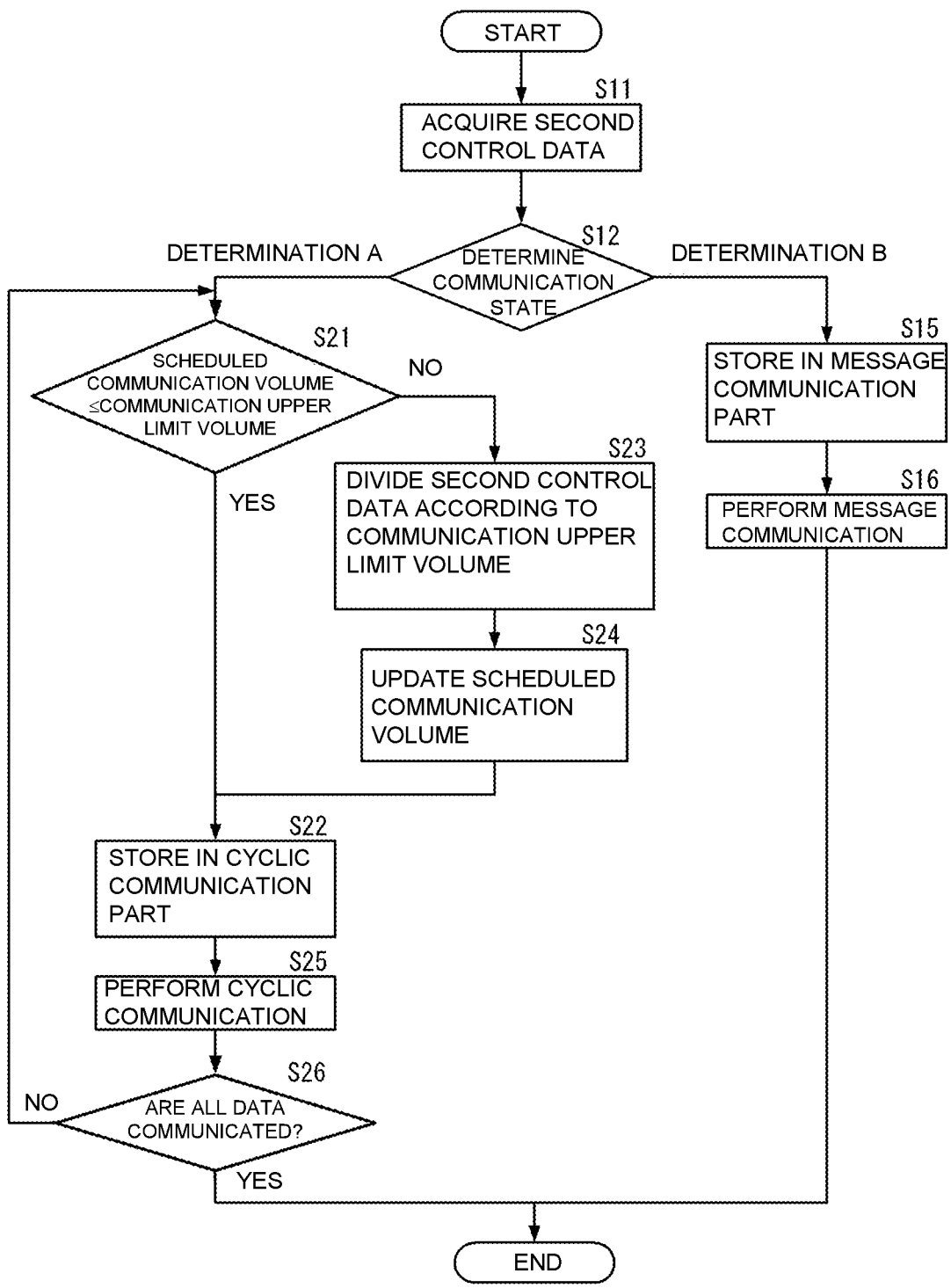
FIG. 7 is a flowchart showing a first application process performed by the control device.

FIG. 7 is a flowchart showing a first application process performed by the control device. The process shown in FIG. 7 shows a case in which a data volume of second control data is larger than one cycle of a cyclic period, and this point is different from the basic process shown in FIG. 5. The other parts of the process shown in FIG. 7 are the same as those of the process shown in FIG. 5 and the same parts will not be described.

When cyclic communication is possible, the control device 10 compares a scheduled communication volume of second control data with a communication upper limit volume. The communication upper limit volume is an upper limit data volume (communication band) allocated to second control data in one cycle of a cyclic period. Specifically, the upper limit data volume is calculated by subtracting a communication volume of first control data from a band allocated to each slave device that performs communication of second control data in one cycle of a cyclic period. In this case, the control device 10 preferably calculates a communication upper limit volume in consideration of performance requirements of second control data. The performance requirements include, for example, an arrival guarantee time of second control data.

When a scheduled communication volume is equal to or smaller than the communication upper limit volume (YES in S21), the control device 10 stores the second control data in the cyclic communication part 121 (S22).

On the other hand, when a scheduled communication volume is larger than the communication upper limit volume (NO in S21), the control device 10 divides the second control data according to the communication upper limit volume and thus generates communication data (S23). The control device 10 subtracts a data volume of communication data that is communicated this time from the scheduled communication volume, and thus updates the scheduled communication volume (S24). The control device 10 stores the communication data in the cyclic communication part 121 (S22).

The cyclic communication part 121 of the control device 10 performs cyclic communication of the stored second control data or communication data (S25).

When communication of all of the acquired second control data is not completed (NO in S26), the control device 10 returns the process to Step S21 and repeats the above processes sequentially. On the other hand, when communication of all of the acquired second control data is completed (YES in S26), the control device 10 ends the process.

When such a process is performed, even if a data volume of second control data is larger than a band (data volume) allocated to second control data in one cycle of a cyclic period, the control device 10 can reliably perform communication of second control data using cyclic communication.

COMMUNICATION PROCESSING EXAMPLE 3

Figure 8:
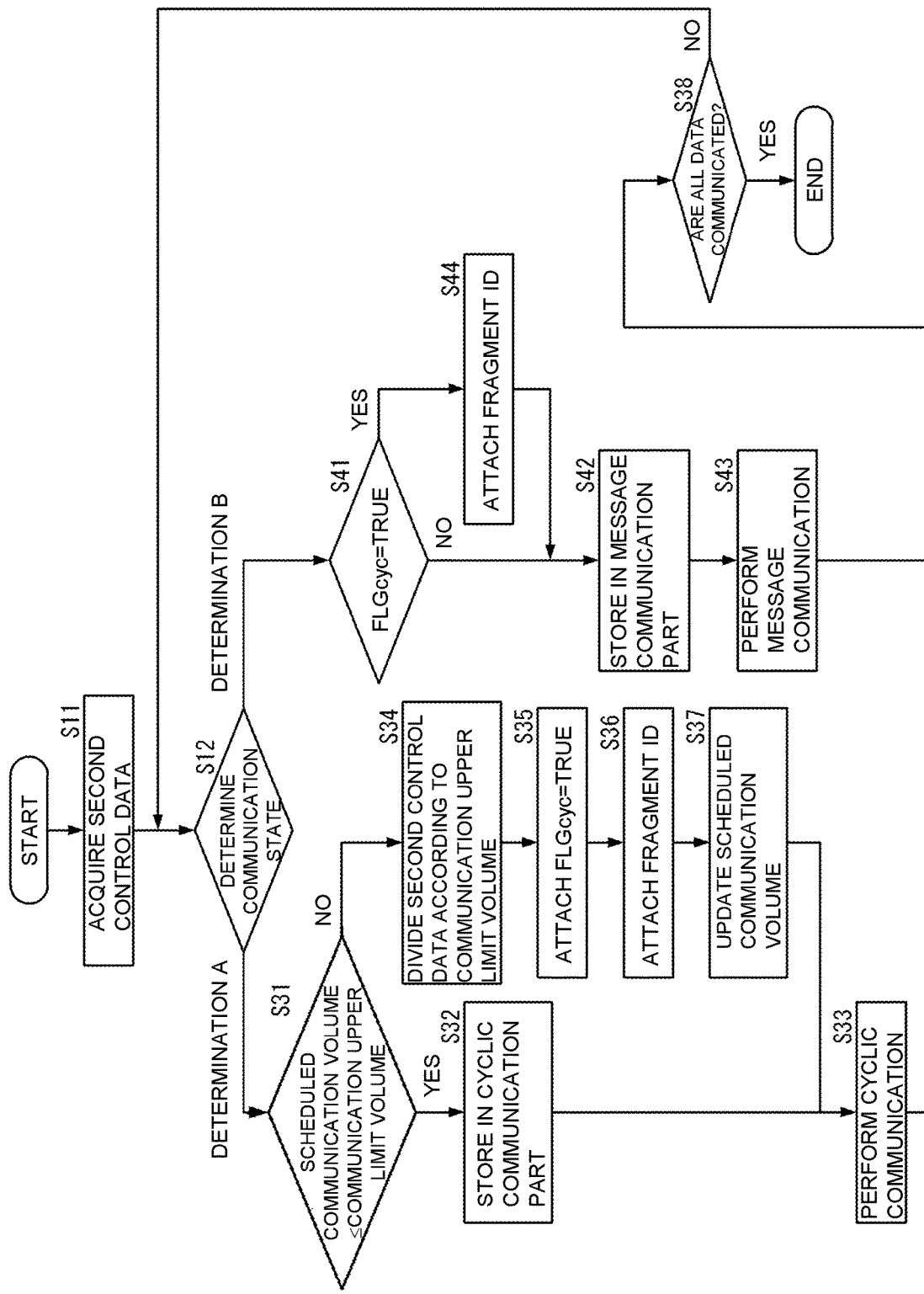
FIG. 8 is a flowchart showing a second application process performed by the control device.

FIG. 8 is a flowchart showing a second application process performed by the control device. The process shown in FIG. 8 is different from the process shown in FIG. 6 in that communication of second control data is switched from cyclic communication to message communication. The other parts of the process shown in FIG. 8 are the same as those of the process shown in FIG. 6, and the same parts will not be described. Steps S31, S32, and S33 shown in FIG. 8 are the same as Steps S21, S22, and S23 shown in FIG. 6.

The control device 10 divides the second control data and generates communication data (S34). The control device 10 attaches flag data FLGcyc to this communication data (S35). FLGcyc is flag data for performing the following process.

In addition, the control device 10 attaches a fragment ID to communication data (S36). The control device 10 updates a scheduled communication volume (S37).

Figure 9:
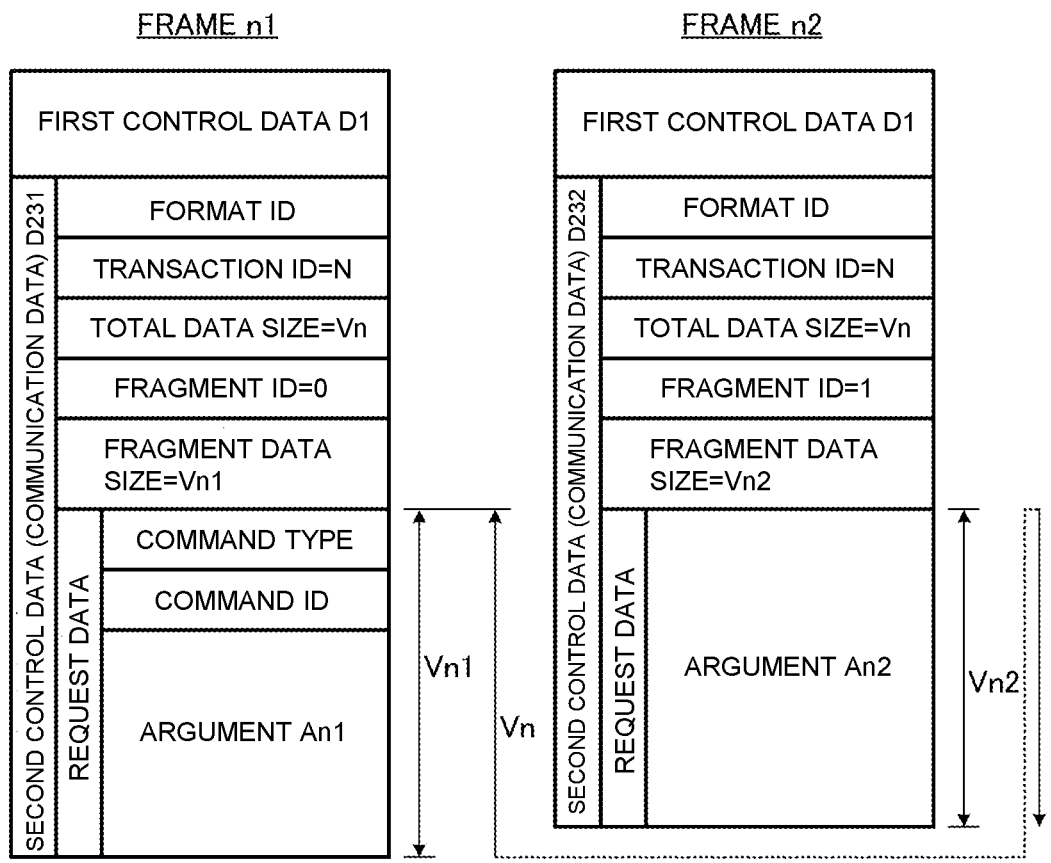
FIG. 9 is a diagram showing a data structure when communication in a divided manner is applied.

In such a process, for example, frame data may have a data structure shown in FIG. 9. FIG. 9 is a diagram showing a data structure when communication in a divided manner is applied. Here, FIG. 9 shows only a band for a slave device for which second control data is necessary.

As shown in FIG. 9, second control data (communication data) D231 of the frame FRAME n1 includes a format ID, a transaction ID, a total data size, a fragment ID, a fragment data size, and request data, and is data arranged in that order from the leading bit.

Second control data (communication data) D232 of the frame FRAME n2 includes a format ID, a transaction ID, a total data size, a fragment ID, a fragment data size, and request data, and is data arranged in that order from the leading bit.

The format ID, the transaction ID, and the total data size are as described above, and description thereof will be omitted.

The fragment ID is identification data indicating the order in the divided second control data. That is, according to the fragment ID, a number of a position of second control data (communication data) in this frame after second control data before communication is divided can be identified. For example, according to the example in FIG. 9, in the FRAME n1, the fragment ID=0 and the data can be identified as first divided communication data. In the FRAME n2, the fragment ID=1 and the data can be identified as second divided communication data.

Therefore, the slave device 221 receives and analyzes communication data of these frames FRAME n1 and FRAME n2, arranges request data according to the order of the fragment ID, and thus can reliably and accurately restore second control data before communication, that is, before division. Accordingly, the slave device 221 can restore the order of the command group included in the second control data correctly and can reliably prevent a malfunction of a robot device and the like. In addition, the slave device 221 detects partial lack of the fragment ID and thus can detect lack of data, and can perform a retransmission request on the control device 10.

The fragment size represents a data volume of second control data (communication data) within the frame. For example, according to the example in FIG. 9, in the FRAME n1, the fragment size=Vn1 and a data volume of first divided communication data can be identified as Vn1. In the FRAME n2, the fragment size=Vn2 and a data volume of second divided communication data can be identified as Vn2. When such a fragment size is attached, the slave device 221 calculates a data volume of received request data, compares fragment sizes, and thus can detect a reception error.

When cyclic communication becomes impossible while second control data is divided and communicated, the control device 10 performs the following process.

When it is determined that cyclic communication is not possible (determination B in S12), the control device 10 detects flag data FLGcyc of the immediately preceding second control data (S41).

When flag data FLGcyc=TRUE is not detected (NO in S41), the control device 10 stores the second control data in the message communication part 122 without attaching a fragment ID thereto (S42). That is, the control device 10 determines that second control data at a timing at which it is determined that cyclic communication is not possible is not divided data, and stores it in the message communication part 122.

When flag data FLGcyc=TRUE is detected (YES in S41), the control device 10 attaches a fragment ID to second control data (communication data) (S44). In this case, for example, the control device 10 detects a fragment ID of the next preceding communication data, performs update in which the fragment ID increments by "1" and attaches it to the data. That is, when it is determined that second control data at a timing at which it is determined that cyclic communication is not possible is divided data, the control device 10 attaches a fragment ID to the data and stores it in the message communication part 122.

The message communication part 122 performs message communication of the stored second control data or communication data (S43).

When communication of all of the acquired second control data is not completed (NO in S38), the control device 10 returns the process to Step S12 and repeats the above processes sequentially. On the other hand, when communication of all of the acquired second control data is completed (YES in S38), the control device 10 ends the process.

When such a process is used, even if cyclic communication is not possible while second control data is divided and communicated, the remaining data of the second control data can be reliably communicated according to message communication. In this case, when a fragment ID is used, even if second control data is communicated according cyclic communication and message communication, the slave device 221 can surely reproduce the sequence of original data and reliably restore second control data.

In addition, when such a process is used, for second control data of which communication was only partially possible due to interruption of cyclic communication, only the remaining data that was not communicated may be communicated according to message communication. Therefore, it is possible to more effectively utilize a band for message communication.

COMMUNICATION PROCESSING EXAMPLE 4

Figure 10:
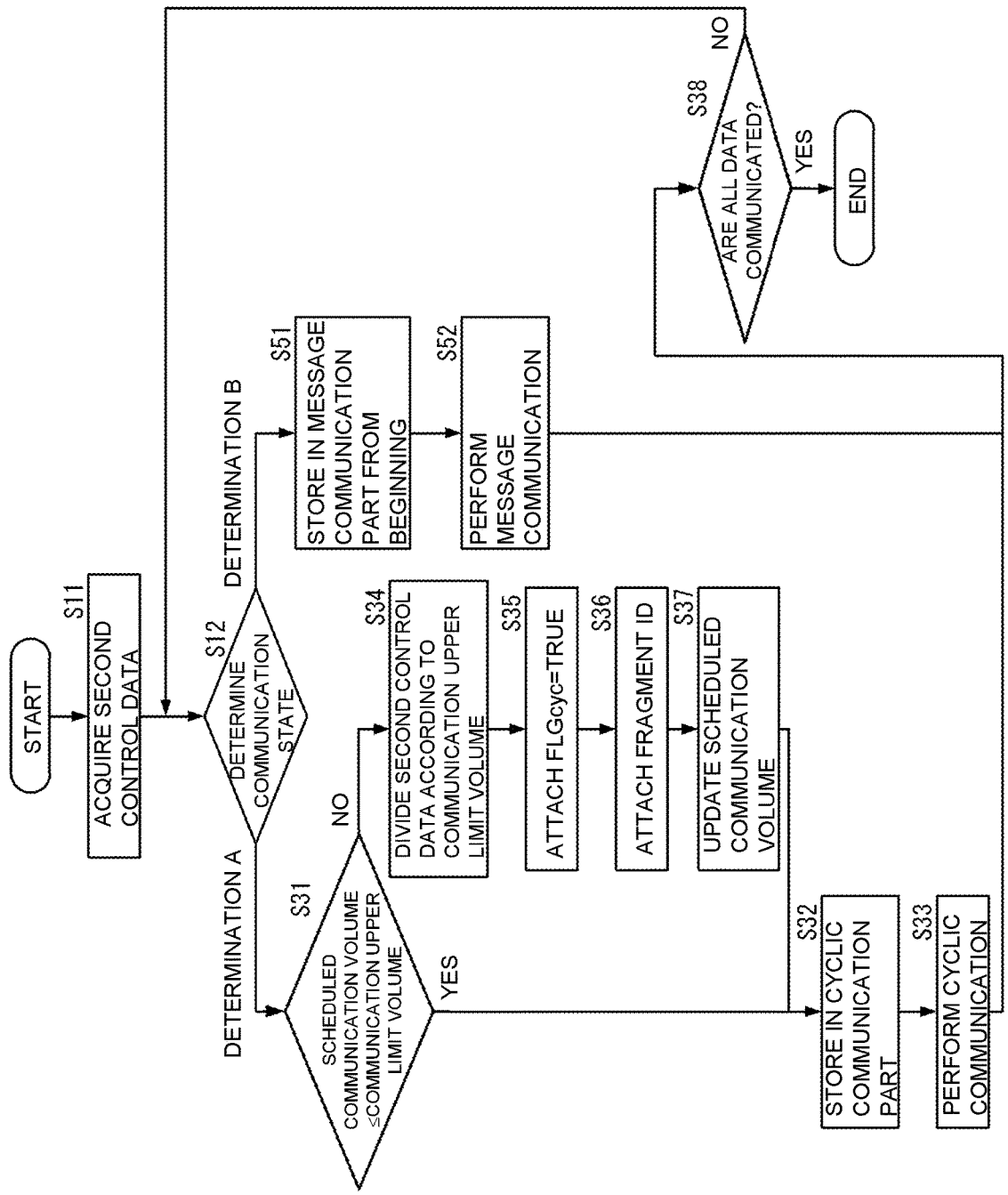
FIG. 10 is a flowchart showing a third application process performed by the control device.

FIG. 10 is a flowchart showing a third application process performed by the control device. The process shown in FIG. 10 is different from the process shown in FIG. 8 in that all interrupted second control data is re-communicated according to message communication. The other parts of the process shown in FIG. 10 are the same as those of the process shown in FIG. 8 and the same parts will not be described.

When it is determined that cyclic communication is not possible (determination B in S12), the control device 10 stores all of the interrupted second control data from the beginning in the message communication part 122 (S51). That is, regarding second control data of which communication is interrupted, the control device 10 stores a data area that is already communicated according to cyclic communication and a data area that is not communicated together in the message communication part 122.

The message communication part 122 performs message communication of the stored second control data (S52).

If such a process is used, all of the second control data can be reliably communicated according to message communication even if cyclic communication becomes impossible while second control data is divided and communicated. In addition, when such a process is used, the slave device 221 can restore second control data without detecting a fragment ID.

COMMUNICATION PROCESSING EXAMPLE 5

Figure 11:
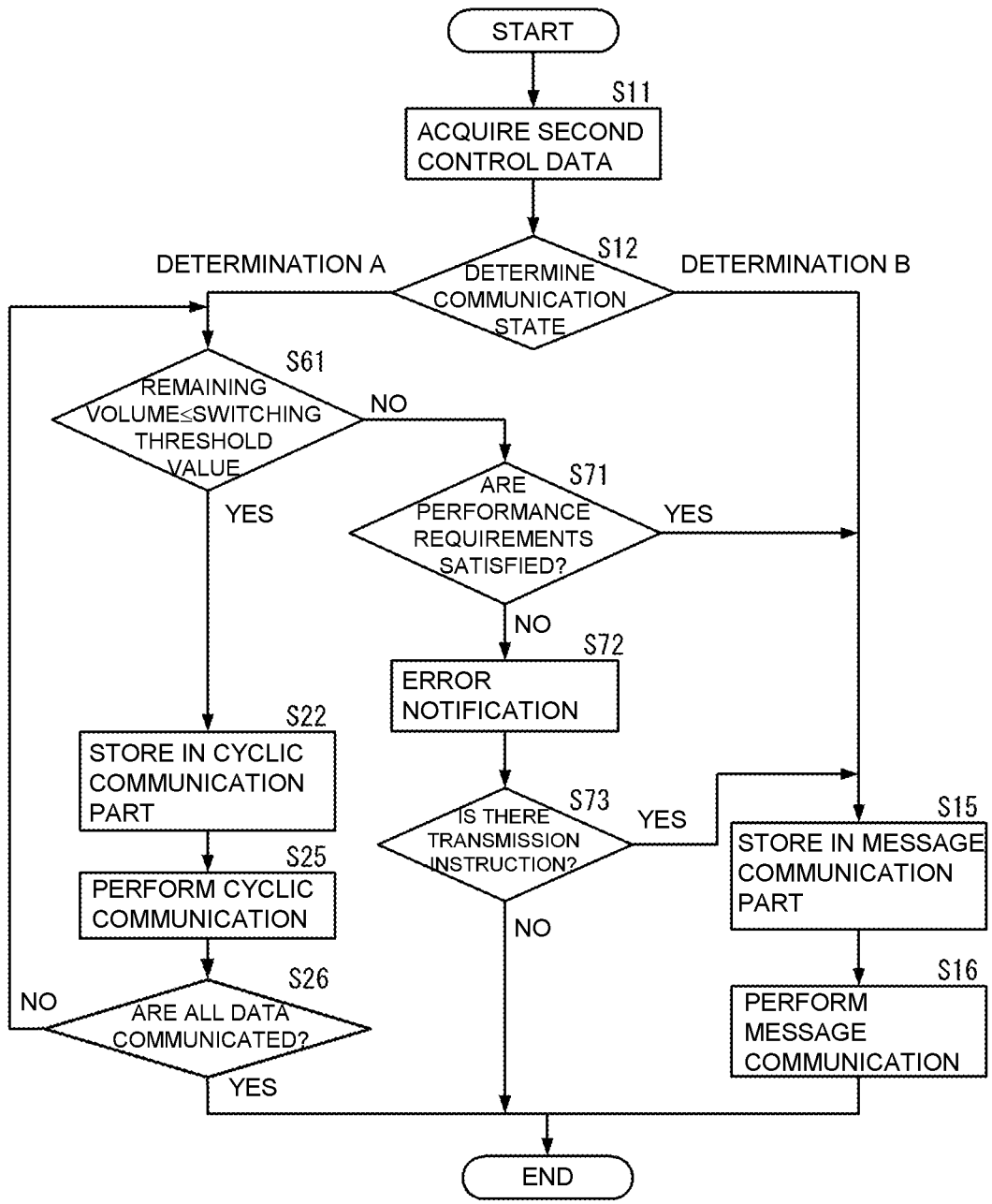
FIG. 11 is a flowchart showing a fourth application process performed by the control device.

FIG. 11 is a flowchart showing a fourth application process performed by the control device. The process shown in FIG. 11 is different from the above processes in that cyclic communication and message communication are selected according to the remaining volume of second control data. Schematically, in the fourth application process, when second control data is divided, if the remaining volume is larger than a switching threshold value and performance requirements are satisfied in a communication band for message communication, the remaining volume of the second control data is communicated using the message communication. In the following description, only parts different from the above processes will be described and the same parts will not be described.

During cyclic communication, the control device 10 compares a non-transmitted part in second control data, that is, the remaining volume, with a switching threshold value (S61). For example, the switching threshold value can be set according to an upper limit data volume at which performance requirements can be satisfied when communication is performed according to cyclic communication continuously while the remaining volume is divided. When the remaining volume is equal to or smaller than a switching threshold value (YES in S61), the control device 10 continues cyclic communication (S22, S25).

When the remaining volume is larger than the switching threshold value (NO in S61), the control device 10 determines whether performance requirements can be realized according to message communication. This determination is realized according to, for example, a message communication available band, the remaining volume, and performance requirements.

For example, when communication of the remaining volume is performed using a message communication available band, if performance requirements are satisfied, the control device 10 determines that performance requirements are satisfied (YES in S71). In this case, the control device 10 performs message communication of data corresponding to the remaining volume of second control data (S15, S16).

When it is determined that performance requirements are not satisfied even if a message communication available band is used (NO in S71), the control device 10 performs error notification (S72). Here, when there is a transmission instruction from a user (YES in S73), message communication of data corresponding to the remaining volume of second control data is performed (S15, S16). In this case, for example, when there is information system data during message communication, the control device 10 may temporarily interrupt the communication and interrupt communication of data corresponding to the remaining volume of second control data. On the other hand, when there is no transmission instruction from a user (NO in S73), the process ends.

When such a process is performed, second control data can be communicated so that performance requirements are satisfied while a communication band for message communication is utilized validly, that is effectively or efficiently.

Here, a mode in which message communication is forcibly performed after error communication without receiving a transmission instruction, and a mode in which the process ends when error communication occurs can be used. In addition, communication can be returned to cyclic communication on the assumption that it is not possible to transmit all data when performance requirements are not satisfied according to message communication.

Here, while an FA system has been exemplified in the above description, the above configuration and process can be applied to other systems in which data for which a time is guaranteed using a cyclic period and data having a longer guarantee time than a cyclic period and having a larger data volume than a data volume based on the cyclic period are transmitted and the above actions and effects can be obtained.

In addition, in the above description, for easy explanation, transmission of data from the control device 10 to the slave device 211, the slave device 212, and the slave device 221 via the control network 30 has been mainly described. However, each data include data that is transmitted from the slave device 211, the slave device 212, and the slave device 221 and replied to the control device 10, and the above process can also be applied to such data and the above actions and effects can be obtained. That is, the above process can be applied to second control data that is communicated via the control network 30, and the above actions and effects can be obtained. For example, regarding second control data for a robot device, data that is transmitted from the control device 10 to the slave device 221 includes a log data acquisition command, and data that is transmitted (replied) from the slave device 221 to the control device 10 includes logging data (for example, angle data of a motor for several tens of seconds) corresponding to the acquisition command.

In addition, while performing of communication according to a TDMA scheme has been described above, division and transmission of second control data can be realized according to a CDMA scheme or the like using the above concept.

In this configuration, control data is communicated by an appropriate communication method according to a communication state even if designation and selection of a communication method of control data are not defined in a control program.

According to an example of the disclosure, the control data includes first control data in which an arrival guarantee time is set according to the cyclic period and second control data in which an arrival guarantee time longer than the cyclic period is set. The control data for selecting the storing is the second control data.

In this configuration, for second control data in which an arrival guarantee time is set, cyclic communication is preferentially applied, and even if cyclic communication cannot be used, and the second control data is communicated according to message communication.

According to an example of the disclosure, when a total data volume of the second control data is larger than a communication upper limit volume that is able to be secured for one cycle of the cyclic period, the communication management part divides the second control data according to the communication upper limit volume for each cyclic period and stores the divided data in the cyclic communication part.

In this configuration, second control data having a large data volume is reliably communicated using cyclic communication.

According to an example of the disclosure, when it is detected that the cyclic communication has changed to an impossible state while the second control data is divided and communicated, the communication management part stores the subsequent second control data in the message communication part.

In this configuration, even if cyclic communication is not possible during communication in a divided manner, it is possible to perform communication of second control data that is not transmitted.

According to an example of the disclosure, when it is detected that the cyclic communication has changed to an impossible state while the second control data is divided and communicated, the communication management part stores all data of the second control data that is divided and communicated in the message communication part.

In this configuration, even if cyclic communication is not possible during communication in a divided manner, it is possible to perform again communication according to message communication.

According to an example of the disclosure, when remaining volume of the second control data is larger than a switching threshold value while the second control data is communicated, the communication management part stores data of the remaining volume in the message communication part.

In this configuration, it is possible to perform communication of second control data by effectively utilizing a communication band for message communication.

According to the disclosure, even with a program configuration simpler than the related art, a plurality of communication methods can appropriately selected according to a communication state to communicate control data. Therefore, a user can create and edit control data without considering a communication state and selection of a plurality of communication methods.

What is claimed is:

1. A control device comprising:
a first memory, configured to perform cyclic communication according to a preset cyclic period;
a second memory, configured to perform message communication that need not conform to the cyclic period; and
a hardware controller, configured to manage a communication schedule for the first memory and the second memory,
wherein, when it is detected that control data scheduled to be communicated is data for preferentially selecting cyclic communication in the first memory, the hardware controller detects a communication state of the first memory, and stores the control data in the first memory when cyclic communication is detected, and stores the control data in the second memory when the cyclic communication is detected,
wherein the control data comprises first control data in which an arrival guarantee time is set according to the cyclic period and second control data in which an arrival guarantee time longer than the cyclic period is set, and the control data for selecting to store is the second control data,
when remaining volume of the second control data is larger than a switching threshold value while the second control data is communicated, the hardware controller stores data of the remaining volume in the second memory.

2. The control device according to claim 1,
wherein, when a total data volume of the second control data is larger than a communication upper limit volume that is able to be secured for one cycle of the cyclic period, the hardware controller divides the second control data according to the communication upper limit volume for each cyclic period and stores the divided data in the first memory.

3. The control device according to claim 2,
wherein, when it is detected that the cyclic communication has changed to an impossible state while the second control data is divided and communicated, the hardware controller stores the subsequent second control data in the second memory.

4. The control device according to claim 2,
wherein, when it is detected that the cyclic communication has changed to an impossible state while the second control data is divided and communicated, the hardware controller stores all data of the second control data that is divided and communicated in the second memory.

5. The control device according to claim 2,
wherein, when remaining volume of the second control data is larger than a switching threshold value while the second control data is communicated, the hardware controller stores data of the remaining volume in the second memory.

6. A control system comprising:
the control device according to claim 1; and
a robot device or robot control device that is communicably connected to the control device,
wherein the second control data comprises a command group for robot control.

7. A control method comprising:
a cyclic communication process of performing cyclic communication according to a preset cyclic period;
a message communication process of performing message communication that need not conform to the cyclic period; and
a communication management process of managing a communication schedule for the cyclic communication process and the message communication process,
wherein the communication management process comprises the following processes:
detecting that control data scheduled to be communicated is data for preferentially selecting cyclic communication;
detecting a communication state of the cyclic communication, and when cyclic communication is detected, performing the cyclic communication of the control data; and
performing the message communication of the control data when the message communication is detected,
wherein the control data comprises first control data in which an arrival guarantee time is set according to the cyclic period and second control data in which an arrival guarantee time longer than the cyclic period is set, and the control data for selecting to store is the second control data,
when remaining volume of the second control data is larger than a switching threshold value while the second control data is communicated, storing data of the remaining volume in the message communication process.

8. A non-transitory computer-readable storage medium storing a control program comprising:
a cyclic communication process of performing cyclic communication according to a preset cyclic period;
a message communication process of performing message communication that need not conform to the cyclic period; and
a communication management process of managing a communication schedule for the cyclic communication process and the message communication process,
wherein the control program causes an information processing device to execute the following processes in the communication management process:
detecting that control data scheduled to be communicated is data for preferentially selecting cyclic communication;
detecting a communication state of the cyclic communication, and when cyclic communication is detected, performing the cyclic communication of the control data; and
performing the message communication of the control data when the eye -lie message communication is detected,
wherein the control data comprises first control data in which an arrival guarantee time is set according to the cyclic period and second control data in which an arrival guarantee time longer than the cyclic period is set, and the control data for selecting to store is the second control data,
when remaining volume of the second control data is larger than a switching threshold value while the second control data is communicated, storing data of the remaining volume in the message communication process.

9. A control system comprising:
the control device according to claim 2; and
a robot device or robot control device that is communicably connected to the control device, wherein the second control data comprises a command group for robot control.

10. A control system comprising:
the control device according to claim 3; and
a robot device or robot control device that is communicably connected to the control device,
wherein the second control data comprises a command group for robot control.

11. A control system comprising:
the control device according to claim 4; and
a robot device or robot control device that is communicably connected to the control device,
wherein the second control data comprises a command group for robot control.

\* \* \* \* \*